Patented Jan. 18, 1927.

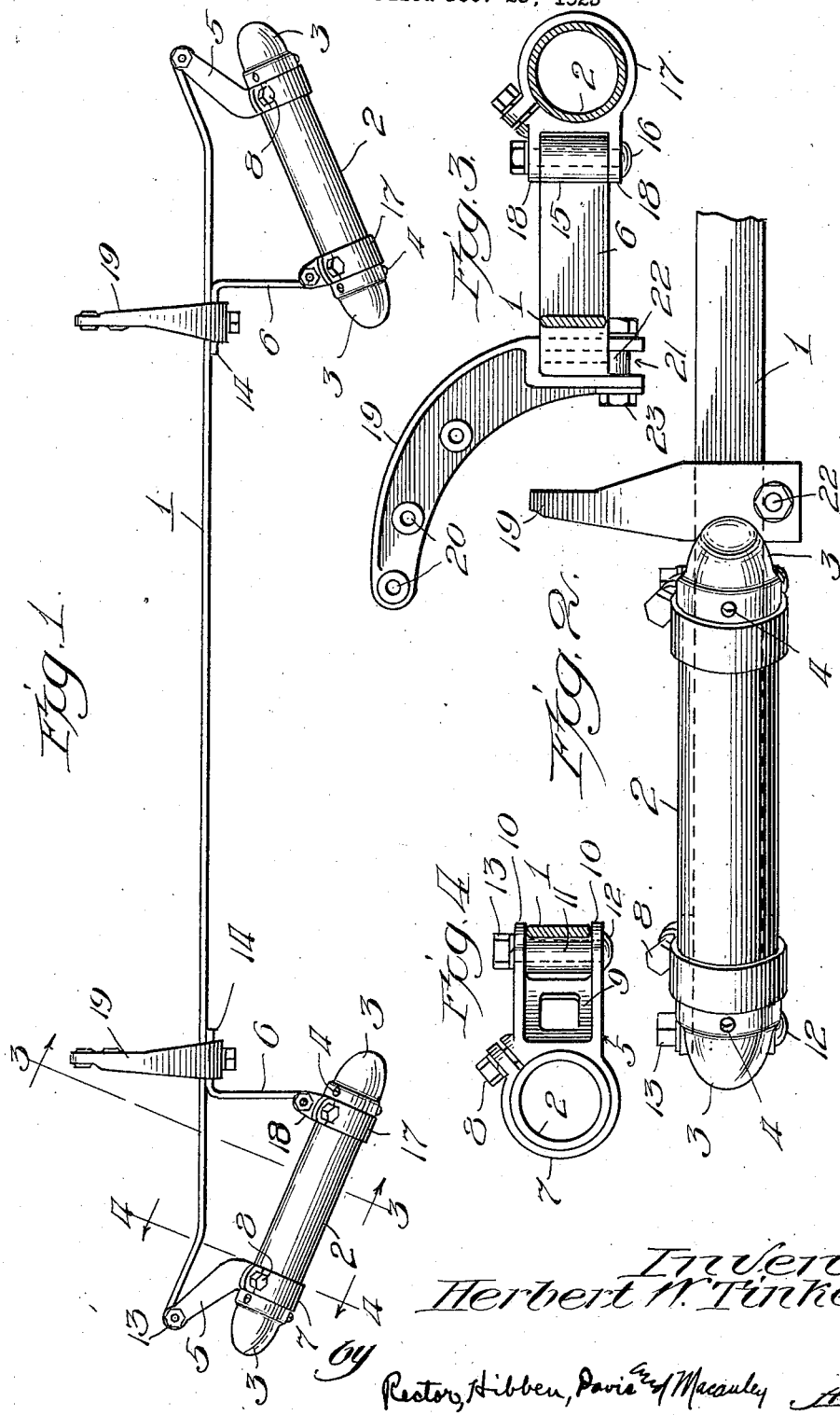

1,614,503

UNITED STATES PATENT OFFICE.

HERBERT W. TINKER, OF MILWAUKEE, WISCONSIN, ASSIGNOR TO FEDERAL PRESSED STEEL COMPANY, OF MILWAUKEE, WISCONSIN, A CORPORATION OF WISCONSIN.

BUMPER STRUCTURE FOR VEHICLES.

Application filed December 23, 1925. Serial No. 77,357.

My invention relates to bumper structure for vehicles and, more particularly, to that class of devices known as round-bar fender guards adapted to be mounted at the rear of the vehicle and in which the impact members are spaced apart horizontally to protect the rear fenders and to permit of the mounting of a spare tire therebetween.

One of the objects of my invention is to provide a durable and efficient round-bar fender guard which is simple in construction, inexpensive to manufacture and attractive to the purchaser, and which is mounted and so constructed as to absorb and reduce to a minimum the transmission of shock to the car frame to which it may be attached.

Another object of my invention is to provide a two-point suspension for a fender guard so arranged that shock incurred through impact will be absorbed and equalized by the bumper guard members regardless of the direction of impact whereby the possibility of injury to the vehicle frame members is practically eliminated or, at least, reduced to a minimum.

A further object is to provide a collapsible fender guard of the round-bar class which is readily collapsible without the further loosening of parts upon removal of the guard from its supporting bracket. This collapsible construction readily permits of shipment of an assembled bumper in a compact package without danger of injury to the parts thereof.

Still another object is to provide fender guards which may be readily applied to the vehicle with a minimum of labor, wherein the collapsible members of the guard are held in their operative guarding position by the supporting brackets.

Other and further objects will be obvious as this description progresses and by reference to the drawing wherein Figure 1 is a top plan view of my new and novel fender guard structure.

Fig. 2 is an enlarged fragmental view showing one end of my guard in front elevation.

Fig. 3 is an enlarged detail sectional view taken on line 3—3 of Fig. 1.

Fig. 4 is an enlarged detail sectional view taken on line 4—4 of Fig. 1.

Referring to the drawing, my novel fender guard may comprise a suspension bar 1 which extends transversely across the rear of the vehicle to which the guard is to be applied. This suspension bar is formed continuous and is made, preferably, of spring metal to provide a resilient support for the impact members 2. The outer end of the bar 1 is, preferably, bent forwardly, the extreme outer ends being turned to form integral eyes for receiving bolts, as will be explained hereinafter. Obviously, if desired, the bending of the ends may be dispensed with so that the bar extends straight across from end to end. The central portion of the suspension bar, as shown, extends straight across the rear of the vehicle, but, if desired, its inner portion may be bent in any direction to accommodate a spare tire mounting not adapted to the construction shown.

The bar 1 is adapted to carry, at each end thereof, the impact members 2. These impact members 2 are of the so-called round bar type, each of them comprising a tubular member of the desired length, having the ends thereof closed by suitable caps 3. These caps are preferably held in place by screws 4. The impact members 2, as well as the caps 3, may be enameled or nickel plated or given whatever finish may be desired by the particular customer. The impact members 2 are suspended and spaced from the bar 1 at two points by two laterally spaced supporting arms 5 and 6. To provide outer support 5 to rigidly withstand all stress conditions which may be imposed thereupon, it preferably comprises a cast member having a split collar formation 7 adapted to fit over the outer surface of the impact member 2 (see Figs. 1 and 4). This collar may be placed and secured upon the impact member 2 by removing the cap 3, adjusting the collar thereon and replacing such cap, and tightening the stud bolt 8 to draw the split sections together. To provide strength and rigidity in support 5 I, preferably, provide the collar portion with an integral arm 9, channel-shaped in cross-section, as shown in Fig. 4, whereby the inwardly extending flanges forming the channel serve as strengthening ribs. Thus, it is seen that I have provided a strong and durable support which will withstand all stresses to which it is probable it may be subjected, at the same time maintaining simplicity and neatness in construction and appearance. It is desirable that the outer end of the impact member 2 be inclined forwardly so as to cause such member to assume an angular position relative to the fender and bar 1 so as to avoid, if possible, direct impact with an approaching vehicle and to cause a glancing blow tending to deliver the stresses imposed by impact to the outer end of the spring bar 1. In order to accommodate this position of the impact bar and to permit its connection with the eye formed in the outer end of the bar 1 in a most advantageous manner to directly transmit the impact stresses to the outer portion of such bar 1, the channeled portion of the arm 9 is bent forwardly so as to form an obtuse angular relation with the collar portion 7. The end of the arm opposite the collar portion 7 has integrally formed lugs 10 adapted to receive therebetween (see Fig. 4) the eye portion 11 of the bar 1. The bar 1 and support 5 are pivotally connected together by the bolt 12 which is passed through openings in the lugs 10 and the eye portion 11, the bolt being secured in place by the nut 13.

The other or inner supporting arm 6 is made, preferably, of spring steel, and has one end bent at right angles to the main body of the arm as at 14, Figs. 1 and 3, the other end being looped to form an eye 15 for receiving the bolt 16, as will be explained later. The eye end of the arm 6 is carried by a cast split collar member 17 which is applied to the impact member 2 in the same manner as the collar portion 7. The collar 17 has integrally formed lugs 18 adapted to receive the eye 15 of the arm therebetween, a pivotal connection being effected between the support 6 and impact member 2 by passing the bolt 16 through openings in the lugs 18 and eye 15.

The fender guard as a whole may be mounted upon the frame of a vehicle by brackets 19 (see Figs. 1, 2 and 3). These brackets have, preferably, a curved contour and are provided with openings 20 through which fastening members may be passed for securing the same to the vehicle. These members take such a shape as to bring the suspension bar and impact members to the proper height for best protecting the fenders, the particular shape and length of such supporting brackets being determined by the particular make or model of vehicle to which the bumper is to be applied.

The suspension bar 1 is carried by the brackets 19. To provide for the connection of the bar 1 to these brackets, each of the brackets is formed with a slotted portion, such as shown at 21 in Fig. 3, adapted to receive both the bar 1 and the right-angled portion 14 of the support 6. The width of the slot may be varied to suit the thickness of the metal of the bar 1 and support 6. The slot 21 is sufficiently long to accommodate the width of the bar and arm 6 and to permit the passage of a bolt 22 therethrough beneath the bar and arm. In installing my bumper upon the vehicle, I preferably fix the brackets 19 in place and then adjust the bar 1 and arm 6 to the respective slots 21, after which the bolt 22 is passed through the slot walls therebeneath and tightened by nut 23 so as to hold the arm 6 clamped tightly to the bar 1. It will be noted that the right-angled portion 14 of the arm 6 which bears against the arm 1 is of sufficient length to present a considerable bearing surface to the bar 1 as well as to allow some leeway in adjusting the bar 1 and arm 6 in the slots to the most desirable position laterally of the vehicle. Furthermore, the length of the support 6 may be varied by substitution to vary the angle of inclination of the impact bar 2.

From the foregoing, it is obvious that I have provided a highly efficient round-bar type of fender guard, wherein impact stresses are transmitted to the resilient outer portions of the spring bar 1 and the pivoted spring metal support 6 instead of directly to the frame of the vehicle. For example, if the impact results by a vehicle or other object striking the bar 2 so as to cause a glancing blow outwardly, the stresses are transmitted through the arm 5 to that portion of the bar 1 outward from the brackets 19 causing the spring bar 1 to move forwardly about its point of attachment, this forward movement being opposed by the spring action of the support 6 whereby such stresses are absorbed and equalized instead of being transmitted directly to the frame members; or, if the impact is in the opposite direction, the impact stresses are received mainly in the arm 6 which is sufficiently resilient to spring at the point where it is connected to the bar 1 and to absorb the force of the shock by such spring action and by the swing of the bar 2 on the pivot formed by the bolt 12. In this latter case there is also the tendency to spring the outer end of the bar 1 rearwardly about its point of attachment to the clamp—, whereby, together with the action of the support 6, the shock, or the greater portion of it, is absorbed and equalized by the bumper members instead of being transmitted directly to the frame members. I accomplish these objects while, at the same time, maintaining simplicity, durability and cheapness in construction.

Another feature of my bumper, made possible by the pivotal connection between the support 5 and bar 1 and arm 6 and collar 17, is that it may be readily collapsed by merely removing the right-angled portion of the arm 6 from the slot in the bracket 19 and moving the arm 6 outwardly so as to permit the member 2 to approach the bar 1. Thus, the bumper may be completely assembled, with the exception of the brackets 19, then collapsed, and then packed for shipment in a compact bundle. When my bumper leaves the hands of the manufacturer it is ready for installation on the car, which may be readily accomplished as hereinbefore set forth.

Having thus described my invention, what I claim is:

1. In a fender guard structure, a spring metal suspension bar adapted to be attached to the vehicle by suitable brackets, and impact members hingedly connected to and spaced from said bar by a plurality of collapsible supporting members.

2. In a fender guard structure, a spring metal suspension bar, an impact member, a support channel-shaped in cross section for connecting and spacing the outer end of said impact member from said bar, and a spring metal support seated upon said bar for spacing the inner end of said member from said bar.

3. In a fender guard structure, a spring metal suspension bar, an impact member, a support channel-shaped in cross section for connecting and spacing the outer end of said impact member from said bar, and a spring metal support seated upon said bar for spacing the inner end of said member from said bar, and a clamp for connecting said inner support to said bar, said clamp being adapted to be attached directly to the vehicle to support the guard structure.

4. In a fender guard structure, a spring metal supporting bar, a round-bar impact member, a support having a portion embracing said member and a portion channel-shaped in cross section pivotally connected to said bar for securing together and spacing the outer end of said member from said bar, and another support pivotally connected to said member and seated upon said bar for spacing the inner end of said member therefrom.

5. In a fender guard structure, a spring metal supporting bar, a round-bar impact member, a support having a portion embracing said member and a portion channel-shaped in cross section pivotally connected to said bar for securing together and spacing the outer end of said member from said bar, and another support pivotally connected to said member and seated upon said bar for spacing the inner end of said member therefrom and a clamp for locking said inner support to the bar, said clamp being adapted to be secured to the vehicle to support the fender guard structure thereon.

6. In fender guard structure, a supporting bar, an impact member located at the end of said bar, a support rigidly fixed to said member and pivotally connected to said bar for supporting the outer end of the impact member, and another spaced from the first and pivotally connected to said member and adapted to be rigidly secured to said bar for supporting the other end of said member.

7. In fender guard structure, a supporting bar, an impact member located at the end of said bar, a support rigidly fixed to said member and pivotally connected to said bar for supporting the outer end of the impact member, and another spaced from the first and pivotally connected to said member and adapted to be rigidly secured to said bar for supporting the other end of said member and a clamp engaging said bar and said inner support for effecting such rigid connection and adapted to be secured directly to the vehicle.

8. In fender guard structure embodying horizontally spaced round-bar impact members, a two point suspension for each of said members.

9. In fender guard structure embodying horizontally spaced round-bar impact members, a single bar from which said members are suspended, and means for effecting a two point suspension between the bar and each member.

10. In fender guard structure embodying horizontally spaced round-bar impact members, a single bar from which said members are suspended, and means alternately hinged to the bar and member for effecting a two point suspension between the bar and each member.

11. In fender guard structure embodying horizontally spaced round-bar impact members, a single bar from which all of said members are suspended, and means for suspending each of said members comprising a casting having an adjustable collar for embracing the outer end of the member with an integral channeled portion turned outwardly and formed for pivotal engagement with the end of said bar, and a flat steel spring support pivotally secured at one end to an adjustable collar embracing the inner end of said member and having its other end right angled to seat flush upon said bar, and means for securing said angled portion to said bar.

12. In a fender guard structure, a spring metal support carrying horizontally spaced round-bar impact members, and a casting embracing the outer end of said member and having an arm channel-shaped in cross section pivotally connected to said bar.

13. In fender guard structure, a suspension bar, an impact member, a plurality of arms for supporting said member on said bar, one of said arms being rigidly connected to said member and pivotally connected to said bar, and the other pivoted to said member and adapted to be seated on said bar, a clamp for securing said other arm to said bar to hold said member in position thereon, said clamp having a portion for engaging the vehicle and a slot formed therein for insertion of said bar and said other arm, and means for closing said slot to fix said parts in position therein.

14. A fender guard collapsible by the removal of the same from its supporting brackets.

15. A collapsible fender guard comprising a suspension bar carrying impact members spaced therefrom by supporting arms pivotally connected thereto, and a bracket for connecting one arm to said bar and to the vehicle to which the guard structure is attached.

In testimony whereof, I have subscribed my name.

HERBERT W. TINKER.